(12) United States Patent
Jayaraman et al.

(10) Patent No.: US 12,481,450 B2
(45) Date of Patent: Nov. 25, 2025

(54) SYSTEMS AND METHODS FOR ACCESSING MEMORY DEVICES USING VIRTUAL MEMORY RANKS

(71) Applicant: Intel Corporation, Santa Clara, CA (US)

(72) Inventors: Ramkumar Jayaraman, Bangalore (IN); Saravanan Sethuraman, Georgetown (MY); Diyanesh Babu Chinnakkonda Vidyapoornachary, Bangalore (IN); Krishnaprasad H, Bangalore (IN)

(73) Assignee: Altera Corporation, San Jose, CA (US)

( * ) Notice: Subject to any disclaimer, the term of this patent is extended or adjusted under 35 U.S.C. 154(b) by 749 days.

(21) Appl. No.: 17/688,631

(22) Filed: Mar. 7, 2022

(65) Prior Publication Data

US 2022/0188019 A1 Jun. 16, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ....... G11C 7/04; G11C 7/1051; G11C 7/1078; G06F 3/0655; G06F 3/0604; G06F 3/0679
See application file for complete search history.

(56) References Cited

U.S. PATENT DOCUMENTS

| | | | |
|---|---|---|---|
| 7,779,215 B2 | 8/2010 | Liou et al. | |
| 2008/0126690 A1* | 5/2008 | Rajan | G06F 13/1673 711/E12.001 |
| 2011/0125966 A1 | 5/2011 | Amidi et al. | |
| 2014/0281191 A1* | 9/2014 | Retter | G06F 12/06 711/105 |
| 2017/0323222 A1* | 11/2017 | Rao | G11C 29/36 |
| 2017/0358369 A1* | 12/2017 | Chinnakkonda Vidyapoornachary | G11C 29/50004 |
| 2018/0075887 A1* | 3/2018 | Bialas, Jr. | G11C 29/50012 |
| 2018/0335828 A1* | 11/2018 | Chun | G06F 1/3234 |
| 2019/0080774 A1* | 3/2019 | Lee | G11C 16/10 |
| 2019/0172516 A1* | 6/2019 | Kim | G11C 29/028 |
| 2024/0055068 A1* | 2/2024 | Bamdhamravuri | G11C 7/222 |

* cited by examiner

*Primary Examiner* — Edward J Dudek, Jr.
(74) *Attorney, Agent, or Firm* — InventIQ Legal LLP; Steven J. Cahill

(57) ABSTRACT

A memory system includes a first set of memory devices, a second set of memory devices, and a memory controller circuit system. The memory controller circuit system groups a first one of the memory devices in each of the first and the second sets into a first virtual memory rank based on eye margins of first data signals sampled by the first virtual memory rank. The memory controller circuit system groups a second one of the memory devices in each of the first and the second sets into a second virtual memory rank based on eye margins of second data signals sampled by the second virtual memory rank. The memory controller circuit system accesses the memory devices in the first virtual memory rank separately from the memory devices in the second virtual memory rank during data access operations.

20 Claims, 8 Drawing Sheets

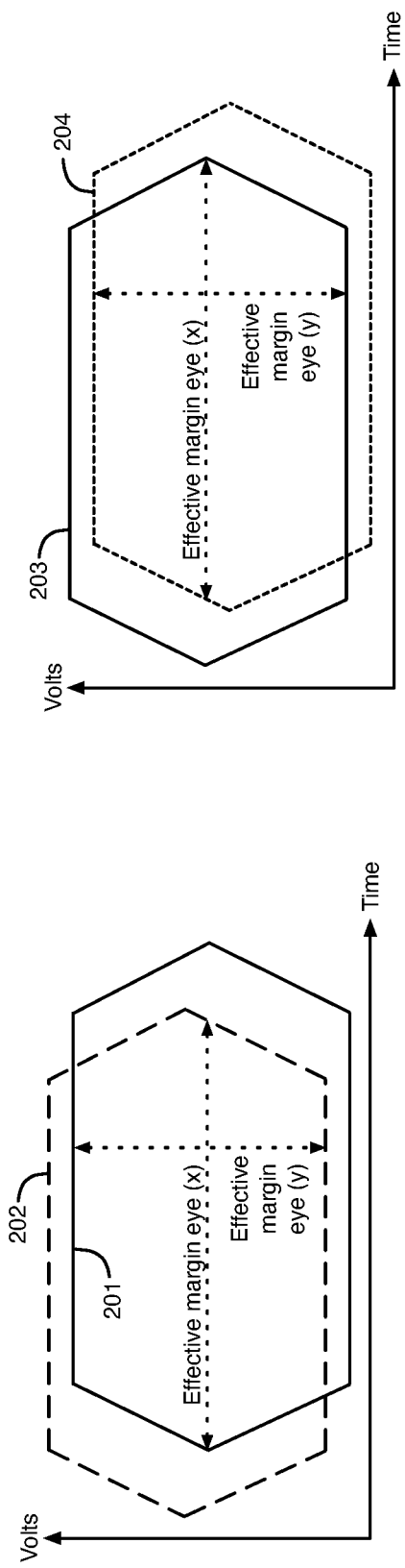
FIG. 2A
FIG. 2B
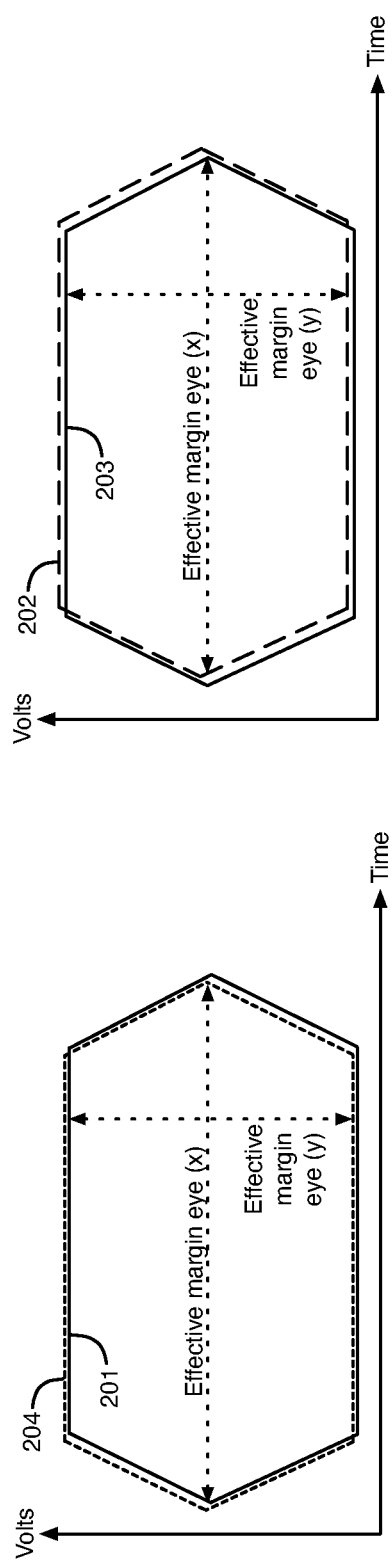
FIG. 2C
FIG. 2D

SYSTEMS AND METHODS FOR ACCESSING MEMORY DEVICES USING VIRTUAL MEMORY RANKS

FIELD OF THE DISCLOSURE

The present disclosure relates to electronic circuit systems, and more particularly, to systems and methods for accessing memory devices using virtual memory ranks.

BACKGROUND

Configurable logic integrated circuits can be configured by users to implement desired custom logic functions. Configurable logic integrated circuits can be used for co-processing in big-data or fast-data applications. For example, configurable logic integrated circuits may be used in application acceleration tasks in a datacenter and may be reprogrammed during datacenter operation to perform different tasks. Accelerator applications often require access to local, high performance, and high bandwidth memory. Programmable Accelerator Cards (PAC) built for such applications are often built with three dimensional stacked memory devices, which offer reduced form factor designs with high memory density. PAC are commonly being deployed in data centers for performing hardware acceleration tasks using configurable logic integrated circuits.

BRIEF DESCRIPTION OF THE DRAWINGS

FIGS. 2A-2D are eye diagrams that illustrate examples of the effective margin eyes for data signals transmitted to memory devices in the memory system of FIG. 1.

DETAILED DESCRIPTION

Figure 1:
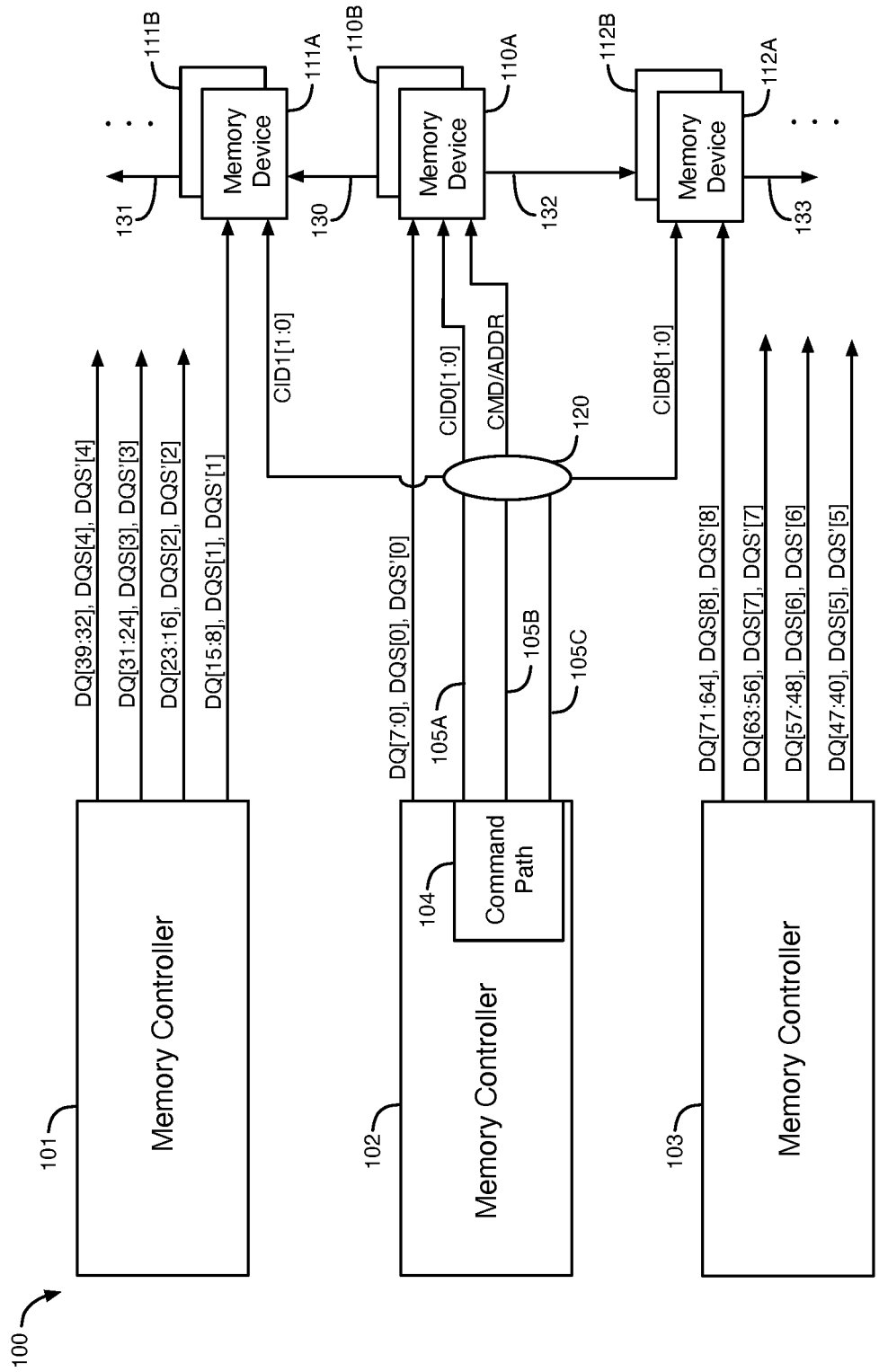
FIG. 1 illustrates an example of an electronic memory system that is able to reduce memory errors in memory devices by grouping the memory devices into virtual memory ranks.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices. The term "circuit" may mean one or more passive and/or active electrical components that are arranged to cooperate with one another to provide a desired function.

In an electronic memory system having a memory controller device and memory devices, such as dynamic random access memory (DRAM) dies, the memory channels between the memory controller device and the memory devices may have different electrical characteristics. The individual memory devices in a three dimensional package may have different electrical and thermal characteristics across the package as well as across memory rank. The different electrical and thermal characteristics between the memory devices and the memory channels can contribute to signal misalignment. Signal misalignment can cause a substantial amount of memory errors between memory channels in a memory system having memory devices. In a memory system having three dimensionally stacked DRAM dies, heat dissipation from the inner layer DRAM dies is restricted, which further increases memory errors due to variations in process, voltage, and temperature (PVT). Also, the increase in temperature of the inner layer DRAM dies causes accelerated degradation of these dies, which can cause more occurrences of bit flip errors in the DRAM dies. Thus, it would be desirable to reduce memory errors caused by signal misalignment between memory channels in a memory system having memory devices.

According to some examples disclosed herein, memory systems and methods are provided that reduce memory errors caused by signal misalignment between memory channels. The memory channels may, for example, be channels between memory devices and one or more memory controller devices in a memory system. Memory errors may be reduced by grouping memory devices in the memory system into virtual memory ranks. The virtual memory ranks provide a flexible mechanism to group and regroup individual memory devices based on various criteria. The memory devices may be grouped into the virtual memory ranks using control signals that are routed directly from a memory controller device to the memory devices. The memory controller device may include a variable delay circuit that compensates for skew between memory command and address signals and the memory rank control signals. The virtual memory ranks may have varying electrical and thermal characteristics across the memory system. Each of the virtual memory ranks is formed by matching the electrical and/or thermal characteristics of different memory devices in the memory system. The virtual memory ranks reduce the effects of outlier memory devices by re-grouping the memory devices under different virtual memory ranks so that the electrical and thermal variances are reduced or close to zero.

FIG. 1 illustrates an example of an electronic memory system 100 that is able to reduce memory errors in memory devices by grouping the memory devices into virtual memory ranks. Memory system 100 includes memory controller circuits 101-103 and interface 120. Memory system 100 also includes memory devices, including memory devices 110A-110B, 111A-111B, and 112A-112B. Memory system 100 also includes busses coupled between the memory devices, including busses 130-133. Memory system 100 may have any number of sets of memory devices. Three sets 110-112 of memory devices are shown in FIG. 1 as an example. The memory devices in each set 110-112 may be coupled together. Each of the sets 110-112 of the memory devices may, for example, be vertically stacked or coupled together through an IC package, interposer, or circuit board. As a specific example that is not intended to be limiting, memory system 100 may include 9 sets of memory devices.

Although FIG. 1 shows 2 memory devices in each of the sets 110-112 of memory devices, each of the sets of memory devices in memory system 100 may include any number of 2 or more memory devices. Each of the memory devices in memory system 100 may be a separate memory integrated circuit (IC) die. The memory devices in memory system 100 may be, for example, dynamic random access memory (DRAM) devices or other types of memory devices. Memory controller circuits 101-103 may be provided in one or more integrated circuits, such as one or more configurable logic integrated circuits (ICs), microprocessor ICs, graphics processing units (GPUs), or application specific ICs. In some implementations, the functions performed by the memory controller circuits 101-103 may be performed by 1 memory controller circuit, 2 memory controller circuits, or 4 or more memory controller circuits. The memory controller circuits in memory system 100 are also collectively referred to herein as a memory controller circuit system.

Each of the memory controller circuits 101-103 generates a set of signals that are provided to a subset of the memory devices in memory system 100. In memory system 100, the memory controller circuits 101-103 generate command/address signals and/or data signals. In the example of Figure (FIG. 1, the three memory controller circuits 101-103 are configured in a cascaded mode to provide a ×72 memory interface by generating 72 data signals DQ[71:0] and 18 strobe signals DQS[8:0] and DQS'[8:0]. The ×72 memory interface is coupled to 9 sets of memory devices (e.g., 9 vertical stacks of memory devices), including memory devices 110A-110B, 111A-111B, and 112A-112B.

Memory controller circuit 102 generates 8 data signals DQ[7:0] and 2 strobe signals DQS[0] and DQS' [0] that are provided to memory devices 110A-110B through a bus. Memory controller circuit 101 generates 32 data signals DQ[39:8] and 8 strobe signals DQS[4:1] and DQS' [4:1]. The 8 data signals DQ[15:8] and the 2 strobe signals DQS[1] and DQS' [1] are provided to memory devices 111A-111B through a bus. The remaining data and strobe signals generated by memory controller circuit 101 are provided to three additional sets of memory devices in memory system 100. Memory controller circuit 103 generates 32 data signals DQ[71:40] and 8 strobe signals DQS[8:5] and DQS' [8:5]. The 8 data signals DQ[71:64] and the 2 strobe signals DQS[8] and DQS' [8] are provided to memory devices 112A-112B through a bus. The remaining data and strobe signals generated by memory controller circuit 103 are provided to three additional sets of memory devices in memory system 100. The data signals DQ may be transmitted according to any protocol, for example, DDR-4, DDR-3, LPDDR-3 or 3DS.

Memory controller circuit 102 includes a command path 104 that generates command and address signals CMD/ADDR that are transmitted through any of busses 105A-105C to interface 120. Interface 120 provides the command and address signals CMD/ADDR to the set 110 of memory devices 110A-110B. Subsets of the command and address signals are provided in a fly-back mode from the set 110 of memory devices to the other sets of memory devices in memory system 100. For example, a subset of the command and address signals is provided from set 110 of memory devices 110A-110B through bus 130 to set 111 of memory devices 111A-111B. Additional subsets of the command and address signals are provided from set 110 of memory devices 110A-110B to three additional sets of the memory devices through busses 130-131 via set 111 of memory devices 111A-111B. Another subset of the command and address signals are provided from set 110 of memory devices 110A-110B through bus 132 to set 112 of memory devices 112A-112B. Additional subsets of the command and address signals are provided from set 110 of memory devices 110A-110B to three additional sets of the memory devices through busses 132-133 via set 112 of memory devices 112A-112B.

The command path 104 in the memory controller circuit 102 also generates chip identification (CID) signals that are transmitted through any of busses 105A-105C to interface 120. Interface 120 provides the CID signals directly to the memory devices in memory system 100 without routing the CID signals through the busses 130-133 in the fly-back mode. Interface 120 provides a different set of the CID signals to each set of the memory devices in memory system 100. For example, interface 120 provides a first set of the CID signals CID0[1:0] to memory devices 110A-110B. Interface 120 provides a second set of the CID signals CID1[1:0] to memory devices 111A-111B. Interface 120 provides a third set of the CID signals CID8[1:0] to memory devices 112A-112B. Command path 104 may, for example, include multiplexers and configurable delay chains that provide programmable delays to the CID signals for compensating for skew effects, as described in further detail below.

FIGS. 2A-2D are eye diagrams that illustrate examples of the effective margin eyes for data signals sampled by memory devices in memory system 100 of FIG. 1. FIGS. 2A-2D illustrate margin plots 201-204 of the voltages of two data signals sampled by 2 memory devices in two different sets (e.g., 2 vertical stacks) of the memory devices in memory system 100. Each of the margin plots 201-204 of FIGS. 2A-2D indicates the voltages of a data signal DQ as sampled using a strobe signal DQS at different times at one of the memory devices in memory system 100. The high and low voltages in the margin plots 201-204 are indicative of digital 1 and 0 bits, respectively. In the examples of FIGS. 2A-2D, each of the sets of memory devices in memory system 100 includes memory devices arranged in a three dimensional (3D) vertical stack. The margin plots 201-202 are for 2 data signals at 2 memory devices in a first vertical stack of the memory devices, and the margin plots 203-204 are for 2 data signals at 2 memory devices in a second vertical stack of the memory devices. As shown in FIG. 2A, the margin plot 202 for one memory device in the first vertical stack exhibits a different range of jitter and voltage tolerances compared to the margin plot 201 for the other memory device in the first vertical stack due to process technology variations between these memory devices. This effect reduces the effective margin eye both in the X-axis and in the Y-axis, as shown in FIG. 2A. FIG. 2B shows that the margin plot 204 for one memory device in the second vertical stack exhibits a different range of jitter and voltage tolerances compared to the margin plot 203 for the other memory device in the second vertical stack due to process technology variations between these memory devices. This effect reduces the effective margin eye both in the X-axis and in the Y-axis, as shown in FIG. 2B.

The memory devices that generate the margin plots 202 and 204 are outlier memory devices that exhibit varying thermal and electrical characteristics compared to the other memory devices in the first and second vertical stacks, respectively. These outlier memory devices reduce the effective electrical margins in the data bus, increasing the probability of memory errors due to signal misalignment. Also, because the operating temperature of a vertically stacked memory device is much higher compared to a conventional memory device, the variations in electrical margins due to thermal effects are significant, which further increases memory errors caused by signal misalignment.

According to some examples disclosed herein, the margin plot 204 from the second vertical stack is combined with the margin plot 201 from the first vertical stack in a first virtual memory rank, and the margin plot 202 from the first vertical stack is combined with the margin plot 203 the second vertical stack in a second virtual memory rank. As a result, the electrical margins of each of the virtual memory ranks are enhanced significantly. As shown in FIG. 2C, the margin plots 201 and 204 are closer together than the margin plots 201 and 202. Also, as shown in FIG. 2D, the margin plots 202 and 203 are closer together than the margin plots 203 and 204. Thus, the jitter and voltage variations are more similar in the groupings of the memory devices shown in FIGS. 2C-2D, than in the groups of the memory devices shown in FIGS. 2A-2B.

Figure 3:
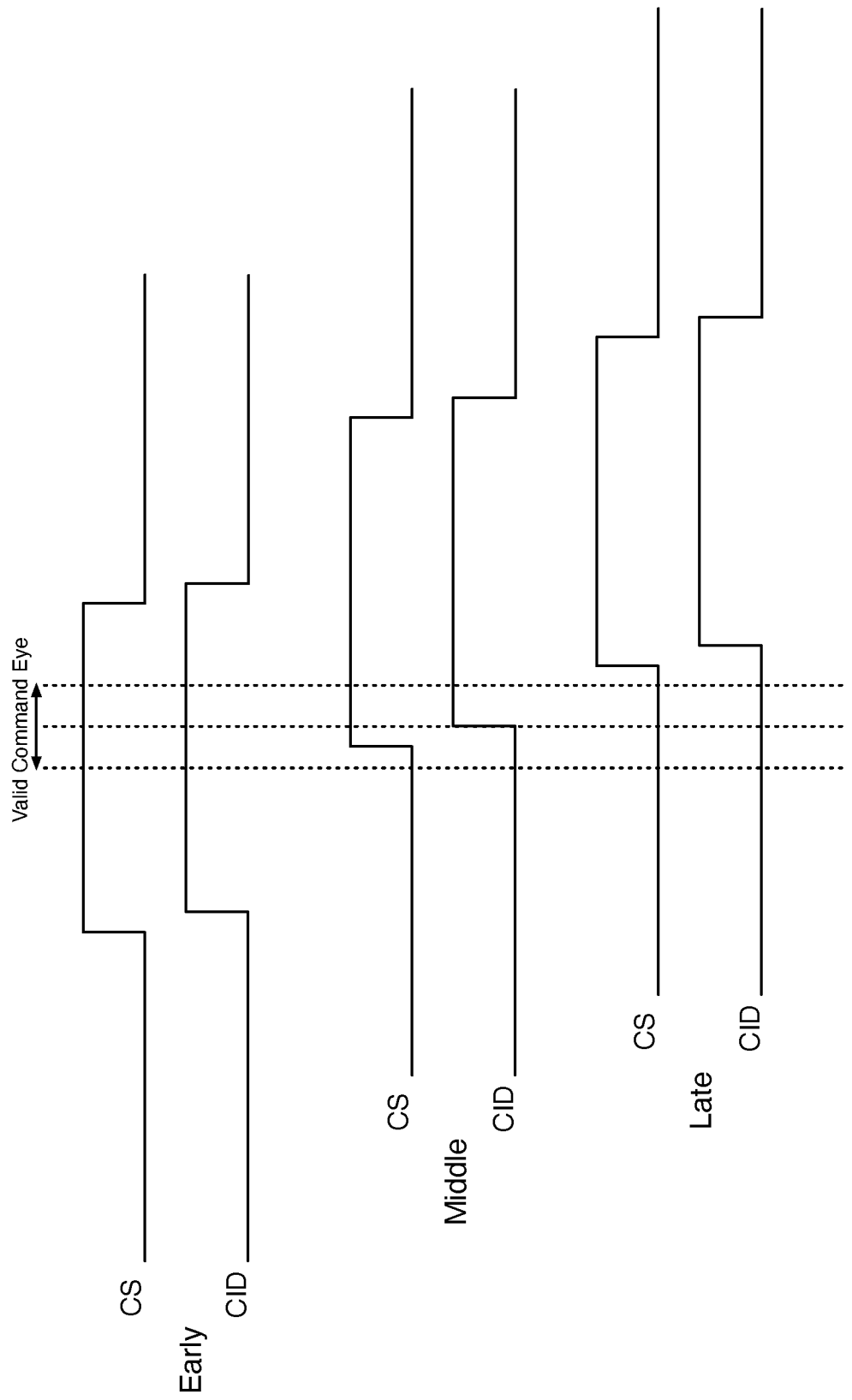
FIG. 3 illustrates diagrams of examples of waveforms for chip select (CS) signals and chip identification (CID) signals transmitted from a memory controller circuit to the memory devices in the memory system of FIG. 1.

FIG. 3 illustrates diagrams showing examples of waveforms for chip select (CS) signals and chip identification (CID) signals that are transmitted from memory controller circuit 102 to the memory devices in memory system 100. In memory system 100, the CS signals may be part of the command signals that are transmitted to the memory devices through busses 105A-105C, interface 120, and busses 130-133 in fly-back mode. In some exemplary implementations, the chip select (CS) signals are used to select one or more sets of the memory devices (e.g., one or more vertical stacks or packages of memory devices) in memory system 100 during memory access operations, such as write operations, from the memory controller circuits. In these implementations, the chip identification (CID) signals are used to select one virtual memory rank in memory system 100 during one or more memory access operations.

In some memory systems, the CID signals need to be aligned with the CS signals at each memory device so that the memory device can recognize the commands correctly. As the CID signals are routed in a point-to-point manner as shown in FIG. 1, the timing of the CID signals is adjusted using adjustable delay circuits in the command path 104 to find the range of delays in the CID signals where the memory devices can sample the incoming command signals successfully. In the top two waveforms shown in FIG. 3, the CS and CID signals are sampled at the memory device too early before the valid command eye. In the middle two waveforms shown in FIG. 3, the CS and CID signals are sampled correctly at the memory device at the middle of the valid command eye. In the bottom two waveforms shown in FIG. 3, the CS and CID signals are sampled at the memory device too late after the valid command eye. The waveforms of FIG. 3 are examples of how the command path 104 can shmoo the CID signals to align the CID signals with the CS signals and the other command signals transmitted from memory controller circuit 102 to the memory devices.

According to some examples, a memory system, such as memory system 100 of FIG. 1, may implement memory calibration algorithms based on training steps dictated by one or more specifications, such as the Joint Electron Device Engineering Council (JEDEC) specifications, with or without a few additional procedures to enhance the electrical reliability of the memory devices. As a specific example, command path 104 may shmoo the CID signals by leveraging a feature that exists in double data rate (DDR) memory systems referred to as per-DRAM Addressing (PDA).

Figure 4:
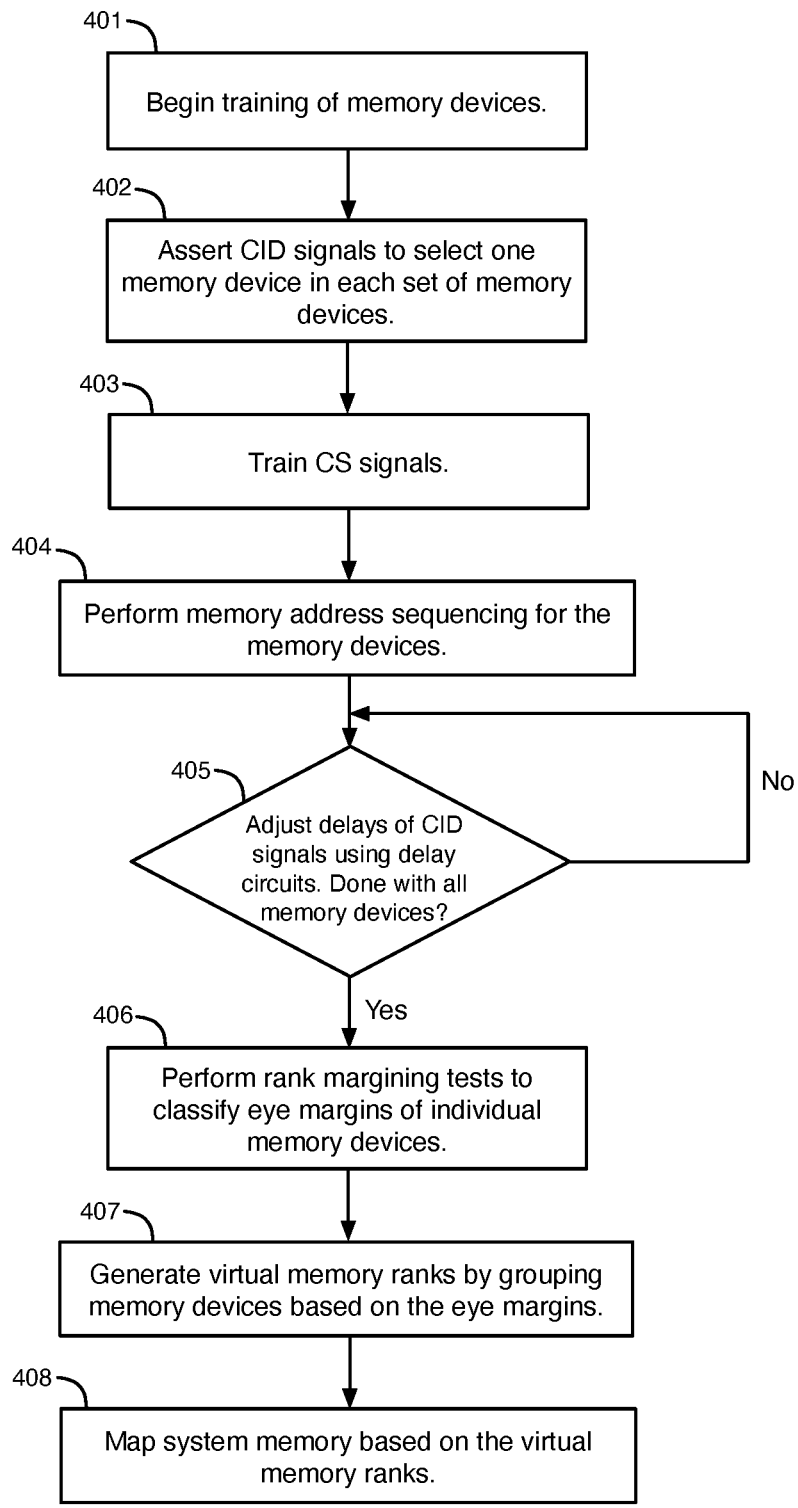
FIG. 4 is a flow chart that illustrates operations that may be performed to train the memory system of FIG. 1 during a calibration procedure to more closely align the command signals to reduce memory errors.

FIG. 4 is a flow chart that illustrates examples of operations that may be performed to train memory system 100 during a calibration procedure to more closely align the command signals to reduce memory errors. The operations of FIG. 4 may, for example, be performed by firmware in the memory system 100. In operation 401, the training of the memory devices, including memory devices 110A-110B, 111A-111B, and 112A-112B, in memory system 100 begins. The memory controller circuit 102 may, for example, contain firmware that controls the training of the memory devices. The physical (PHY) layer in the memory controller circuit 102 may be initialized to start the training of the memory devices in memory system 100 in operation 401. In operation 402, the CID signals are asserted (e.g., to 0) to select one of the memory devices in each set of the memory devices in memory system 100. For example, memory system 100 may include vertical stacks of memory devices, and the CID signals may be asserted in operation 402 to values that select the bottom memory device in each vertical stack of memory devices in memory system 100. The selection performed in operation 402 may be set constant throughout the calibration procedure.

In operation 403, the CS signals are trained, such that the timing relationship between the CS signals and other command signals generated by memory controller circuit 102, such as clock signals, are deduced. In operation 404, memory address (e.g., PDA) sequencing is performed for the memory devices, such that the memory devices in memory system 100 are individually selected sequentially. In operation 405, adjustable delay circuits in command path 104 shmoo the CID signals to find a valid eye with respect to the CS signals. The adjustable delay circuits adjust the delays of the CID signals in operation 405 to cause selected edges of the CID signals (e.g., rising and/or falling edges) to fall within the valid command eye (e.g., as shown in FIG. 3) that corresponds to a passing timing range for the CID signals. Memory system 100 performs operation 405 for each of the memory devices in memory system 100, until the CID signals have been adjusted to a passing timing range for all of the memory devices in memory system 100.

After shmooing the CID signals for each of the memory devices in memory system 100, memory system 100 performs rank margining tests in operation 406 to classify the eye margins of the individual memory devices in memory system 100. As an example, memory system 100 may perform rank margining tests in operation 406 by generating a margin plot, such as the margin plots shown in FIGS. 2A-2D, for each of the memory devices in memory system 100. The margin plot for each of the memory devices may include an eye diagram illustrating an eye margin for the voltage of a data signal sampled by the memory device.

In operation 407, memory system 100 generates virtual memory ranks by grouping the memory devices based on the eye margins of the memory devices. In operation 407, memory system 100 groups together memory devices that have closely matching eye margins into the same virtual memory rank. Memory system 100 generates 2 or more of the virtual memory ranks. Each of the virtual memory ranks includes memory devices having similar eye margins. The eye margins are determined by the rank margining tests performed in operation 406. Memory system 100 may, for example, group memory devices that are in different sets of the memory devices (e.g., different vertical stacks of memory devices), but have similar eye margins, into the same virtual memory rank. Memory system 100 then programs the adjustable delay circuits in command path 104 that generate the CID signals based on how the memory devices are grouped into the virtual memory ranks generated in operation 407. In operation 408, memory system 100 maps the system memory based on the virtual memory ranks generated in operation 407. Memory system 100 may then proceed with system boot.

Figure 5:
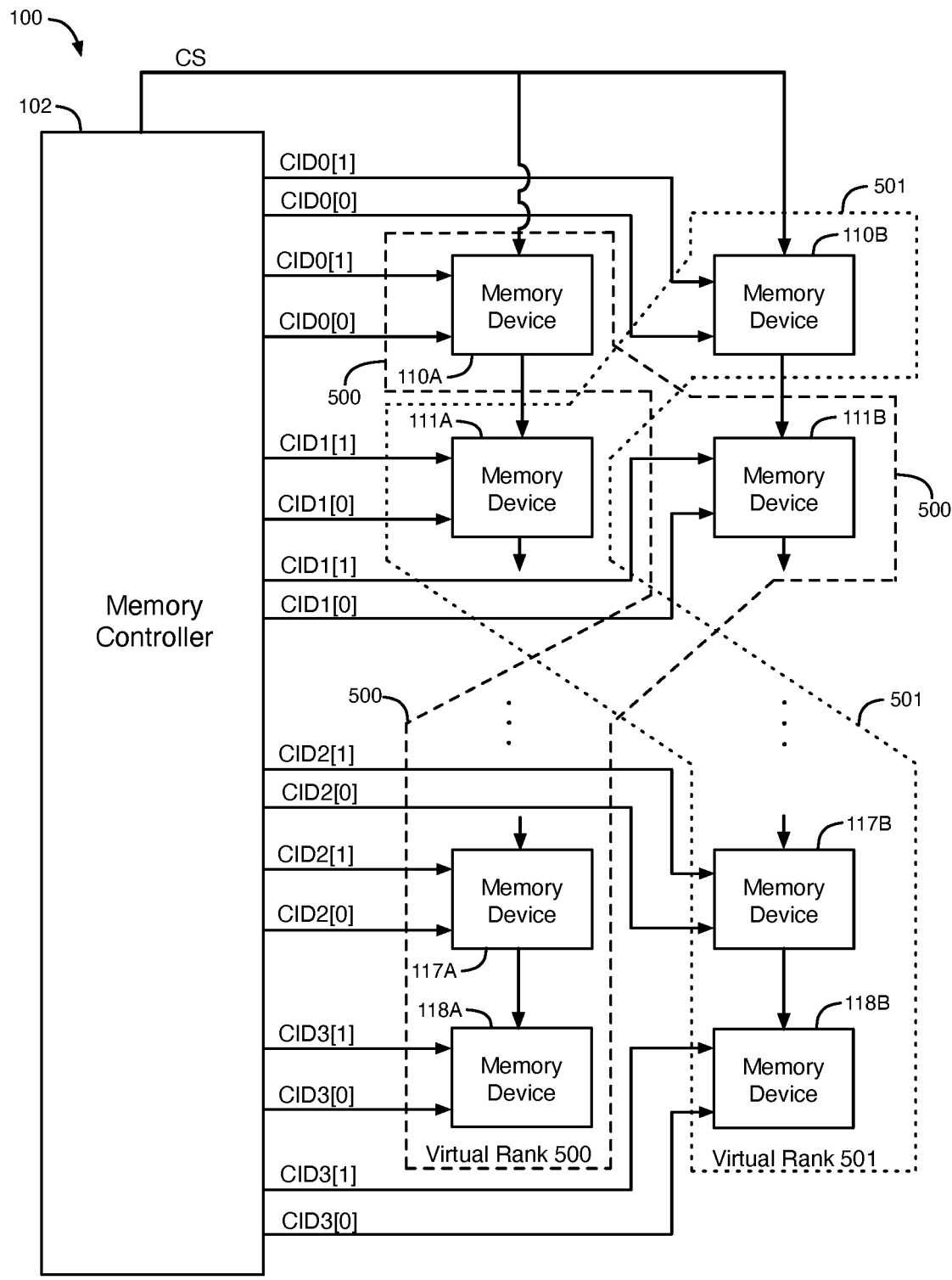
FIG. 5 is a diagram of the memory system of FIG. 1 that illustrates examples of two of the virtual memory ranks generated using the operations of FIG. 4.

FIG. 5 is a diagram of memory system 100 that illustrates two examples of the virtual memory ranks generated using the operations of FIG. 4. In the example of FIG. 5, memory system 100 includes at least 4 sets of memory devices 110, 111, 117, and 118. FIG. 5 shows 2 memory devices in each of the sets 110, 111, 117, and 118. Although, it should be understood that each set may include any number of 2 or more memory devices. Set 110 includes memory devices 110A-110B. Set 111 includes memory devices 111A-111B. Set 117 includes memory devices 117A-117B. Set 118 includes memory devices 118A-118B. The memory devices in each of the sets 110-111 and 117-118 may, for example, be vertically stacked in a three-dimensional arrangement. In operation 407, the memory devices in memory system 100 are grouped into virtual memory ranks 500 and 501 based on the eye margins of the memory devices generated during the rank margining tests performed in operation 406.

Virtual memory rank 500 includes memory devices 110A, 111B, 117A, and 118A. Virtual memory rank 501 includes memory devices 110B, 111A, 117B, and 118B. Thus, each of the virtual memory ranks 500 and 501 includes a memory device from each of the sets of memory devices 110, 111, 117, and 118. Memory system 100 groups memory devices 110A, 111B, 117A, and 118A into the same virtual memory rank 500, because memory devices 110A, 111B, 117A, and 118A have similar eye margins as measured by their margin plots. Memory system 100 groups memory devices 110B, 111A, 117B, and 118B into the same virtual memory rank 501, because memory devices 110B, 111A, 117B, and 118B have similar eye margins as measured by their margin plots. FIGS. 2C-2D illustrate examples of the margin plots after the memory devices of memory system 100 have been grouped into the virtual memory ranks.

The adjustable delay circuits in command path 104 output chip identification (CID) signals that are provided directly to each of the memory devices in memory system 100, as disclosed herein with respect to FIG. 1. Signals CID0[0] and CID0[1] are provided to memory devices 110A-110B. Signals CID1[0] and CID1[1] are provided to memory devices 111A-111B. Signals CID2[0] and CID2[1] are provided to memory devices 117A-117B. Signals CID3[0] and CID3[1] are provided to memory devices 118A-118B. Memory controller circuit 102 also outputs the CS signals that are provided to the memory devices in memory system 100 in fly-back mode.

Figure 6:
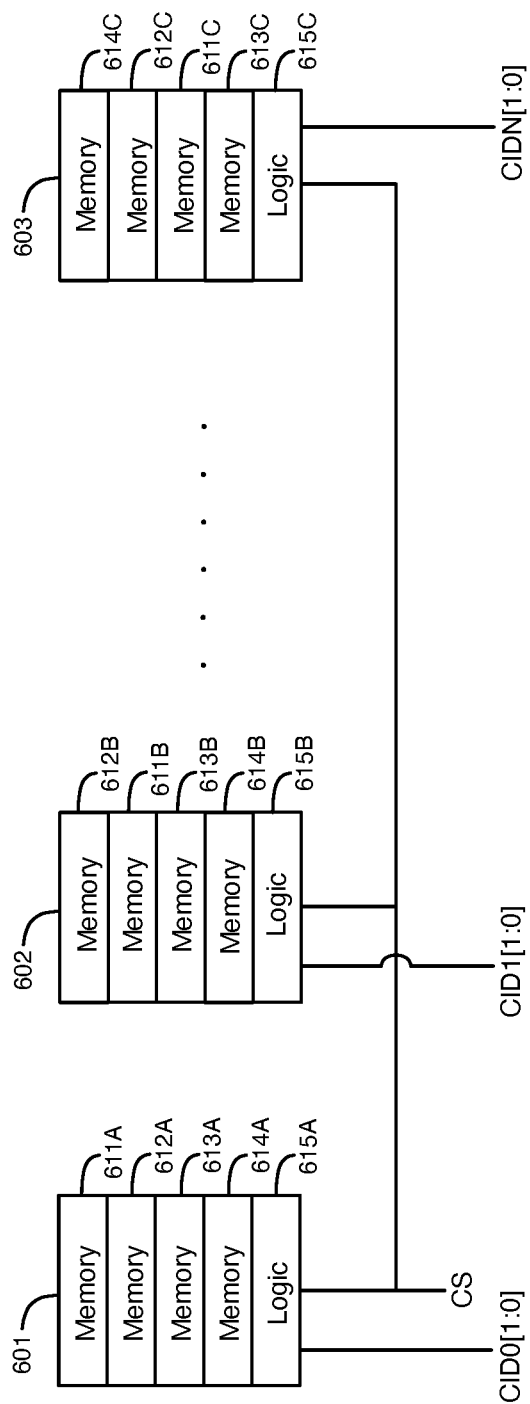
FIG. 6 is a diagram that illustrates examples of vertical stacks of memory devices that are grouped according to virtual memory ranks.

FIG. 6 is a diagram that illustrates examples of vertical stacks of memory devices that are grouped according to virtual memory ranks. FIG. 6 illustrates memory devices 611A-611C, 612A-612C, 613A-613C, and 614A-614C. FIG. 6 also shows 3 logic devices 615A-615C. The memory devices shown in FIG. 6 are grouped into three vertical stacks that are arranged three dimensionally. The first vertical stack includes memory devices 611A-614A and logic device 615A. The second vertical stack includes memory devices 611B-614B and logic device 615B. The third vertical stack includes memory devices 611C-614C and logic device 615C. The memory devices shown in FIG. 6 may, for example, be provided in memory system 100. The memory system may include additional vertical stacks of memory devices that are not shown in FIG. 6.

Memory controller circuit 102 provides chip select signals CS to each of the vertical stacks of the memory devices of FIG. 6. Memory controller circuit 102 also provides chip identification signals CID0[1:0], CID1[1:0], and CIDN[1:0] to the three vertical stacks containing memory devices 611A-614A, 611B-614B, and 611C-614C, respectively.

In the example of FIG. 6, memory system 100 groups memory devices 611A, 611B, and 611C into a first virtual memory rank, because memory devices 611A, 611B, and 611C have similar eye margins as measured by their margin plots. Memory system 100 groups memory devices 612A, 612B, and 612C into a second virtual memory rank, because memory devices 612A, 612B, and 612C have similar eye margins as measured by their margin plots. Memory system 100 groups memory devices 613A, 613B, and 613C into a third virtual memory rank, because memory devices 613A, 613B, and 613C have similar eye margins as measured by their margin plots. Memory system 100 groups memory devices 614A, 614B, and 614C into a fourth virtual memory rank, because memory devices 614A, 614B, and 614C have similar eye margins as measured by their margin plots. Logic devices 615A, 615B, and 615C are on the bottoms of the stacks. Thus, as shown in FIG. 6, each of the virtual memory ranks has a memory device in each of the vertical stacks. Also, each of the first, second, third, and fourth virtual memory ranks has a memory device in at least two different levels of the vertical stacks.

After the memory devices in memory system 100 have been grouped into virtual memory ranks, memory controller circuits 101-103 can perform data access operations (e.g., read or write operations) to one or more of the memory devices in each virtual memory rank. Prior to a data access operation, memory controller circuit 102 selects one of the virtual memory ranks by asserting the CID signals provided to the memory devices in that virtual memory rank. The memory devices in only one of the virtual memory ranks can be activated to perform read or write operations at any one time. The memory controller circuits 101-103 then perform memory access operations to one or more of the memory devices in the selected virtual memory rank. Only the memory devices in the virtual memory rank selected by the CID signals are activated to perform read or write operations. In some examples, only one of the memory devices in each set of the memory devices is activated during a data access operation. If the memory devices are arranged in vertical stacks, then only one memory device in each vertical stack in the selected virtual memory rank is activated to perform read or write operations at any one time. Memory system 100 accesses the memory devices in each virtual memory rank separately during read and write operations. For example, when memory controller circuit 102 asserts a first set of the CID signals to select the first virtual memory rank of FIG. 6, memory controller circuits 101-103 may perform one or more data access operations to the memory devices 611A, 611B, and 611C in the first virtual memory rank. As another example, when memory controller circuit 102 asserts a second set of the CID signals to select the second virtual memory rank of FIG. 6, memory controller circuits 101-103 may perform one or more data access operations to the memory devices 612A, 612B, and 612C in the second virtual memory rank.

Figure 7:
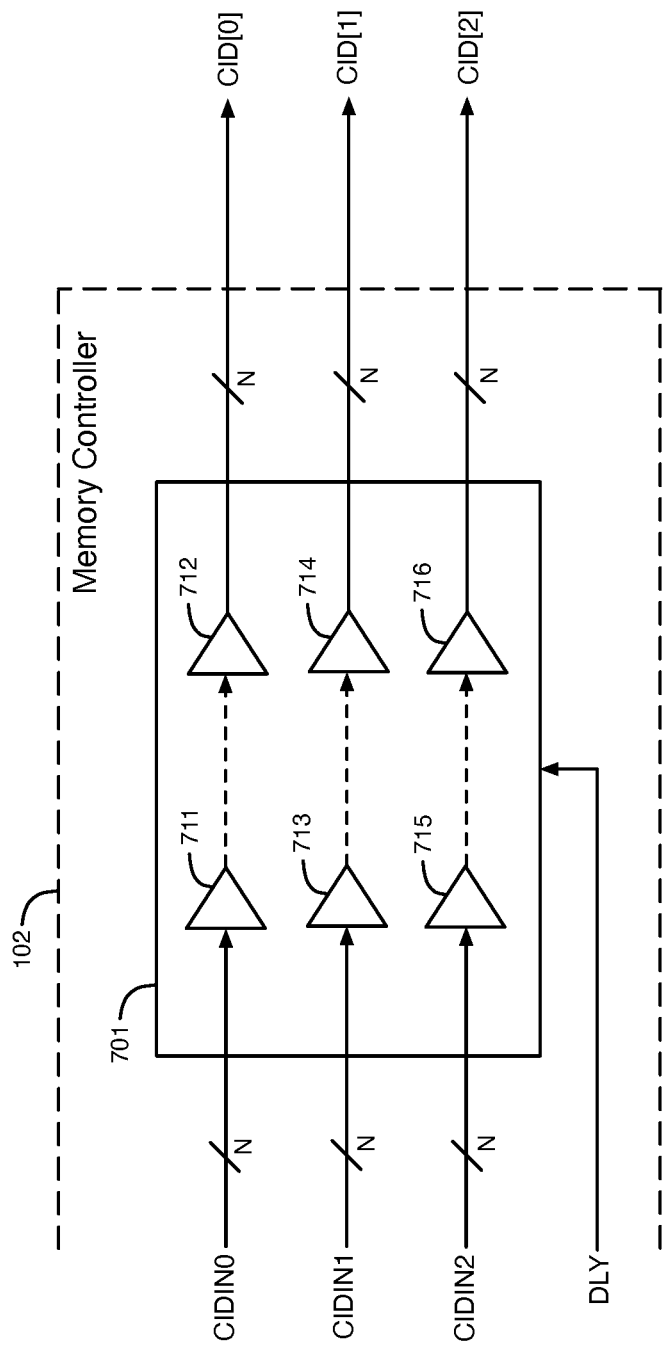
FIG. 7 illustrates details of an example of an adjustable delay circuit in the memory controller circuit in the memory system of FIG. 1.

FIG. 7 is a diagram that illustrates details of an example of an adjustable delay circuit 701 in the memory controller circuit 102 in the memory system 100 of FIG. 1. The adjustable delay circuit 701 can adjust the delays of the CID signals to align the delay adjusted CID signals with respect to the other command signals so that the memory devices in the memory system 100 can accurately sample the command signals. The adjustments to the delays of the CID signals provided by the adjustable delay circuit 701 can compensate for skew caused by process variations between the memory devices. Adjustable delay circuit 701 may, for example, be in command path 104 in FIG. 1.

In the example of FIG. 7, adjustable delay circuit 701 includes 3 adjustable delay chains. Each of the adjustable delay chains in adjustable delay circuit 701 includes multiple delay circuits that are coupled together in series to delay one or more of the CID signals. For example, adjustable delay circuit 701 includes a first delay chain having delay circuits 711 and 712, a second delay chain having delay circuits 713 and 714, and a third delay chain having delay circuits 715 and 716. Each of the delay chains may have additional delay circuits that are not shown in FIG. 7. The first delay chain having delay circuits 711-712 delays an N number of first input chip identification signals CIDIN0 to generate an N number of delayed chip identification signals CID[0]. N may be any positive integer greater than 1. The second delay chain having delay circuits 713-714 delays an N number of second input chip identification signals CIDIN1 to generate an N number of delayed chip identification signals CID[1]. The third delay chain having delay circuits 715-716 delays an N number of third input chip identification signals CIDIN2 to generate an N number of delayed chip identification signals CID[2]. In the example of FIG. 7, one of the signals CID[0], one of the signals CID[1], and one of the signals CID[2] may be provided to each of the memory devices in the memory system 100.

Delay control signals DLY are provided to delay control inputs of the adjustable delay circuit 701, as shown in FIG. 7. The delay control signals DLY control the delay of each of the adjustable delay chains in the adjustable delay circuit 701. The values of the delay control signals DLY are varied to adjust the delays that the adjustable delay chains in the adjustable delay circuit 701 provide to the delayed CID[0], CID[1], and CID[2] signals. The values of the delay control signals DLY are varied to shmoo the CID[0], CID[1], and CID[2] signals with respect to the CS signals and the other command signals (e.g., in operation 405 of FIG. 4), so that the memory devices in the memory system 100 can accurately sample the CID and command signals. Subsets of the delay control signals DLY can be adjusted to independently control the delays of the CID[0], CID[1], and CID[2] signals.

Figure 8:
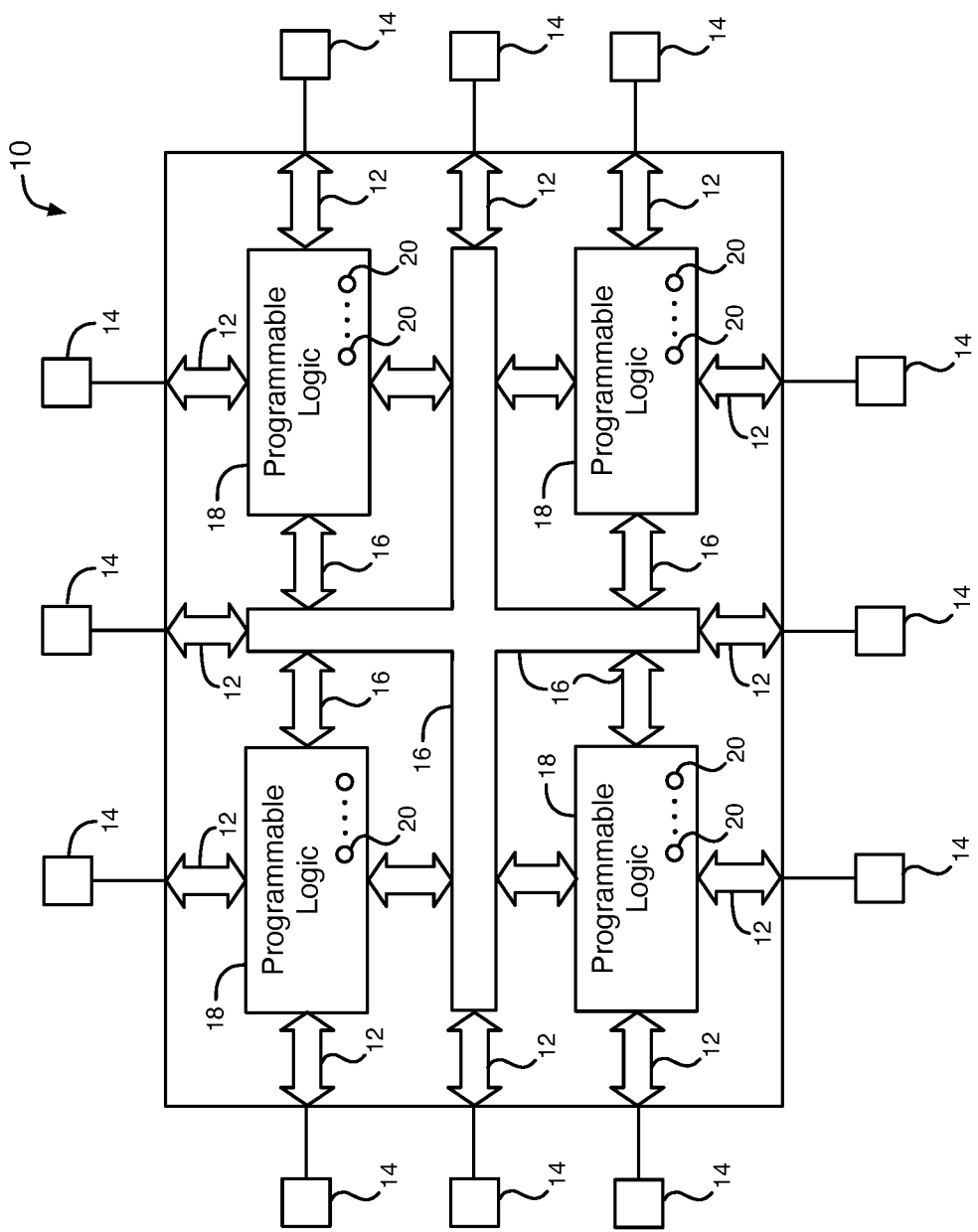
FIG. 8 is a diagram of an illustrative programmable logic integrated circuit (IC) that may include portions of the memory system of FIG. 1.

An illustrative programmable logic integrated circuit (IC) 10 that may include portions of one or more memory systems 100 is shown in FIG. 8. As shown in FIG. 8, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic circuitry 18 may be configured to perform custom logic functions. One or more portions of the programmable logic circuitry 18 may be configured as one or more of the memory controller circuits 101-103, as disclosed herein with respect to FIG. 1.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of metal-oxide-semiconductor (MOS) transistors. In the context of programmable integrated circuits, the memory elements 20 store configuration data and are sometimes referred to as configuration random-access memory (CRAM) cells.

In general, software and data for performing any of the functions disclosed herein, including the firmware in memory system 100, may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is a memory system comprising: a first set of memory devices; a second set of memory devices; and a memory controller circuit system that groups a first one of the memory devices in each of the first and the second sets into a first virtual memory rank based on eye margins of first data signals sampled by the first virtual memory rank, wherein the memory controller circuit system groups a second one of the memory devices in each of the first and the second sets into a second virtual memory rank based on eye margins of second data signals sampled by the second virtual memory rank, and wherein the memory controller circuit system accesses the memory devices in the first virtual memory rank separately from the memory devices in the second virtual memory rank during data access operations.

In Example 2, the memory system of Example 1 may optionally include, wherein the memory controller circuit system provides first identification signals to the memory devices in the first set, wherein the memory controller circuit system provides second identification signals to the memory devices in the second set without routing the second identification signals through the first set of the memory devices, and wherein the memory controller circuit system comprises an adjustable delay circuit that adjusts delays of the first and the second identification signals to compensate for skew between command signals provided to the memory devices in the first and the second sets.

In Example 3, the memory system of Example 2 may optionally include, wherein the memory controller circuit system selects the memory devices in the first virtual memory rank using the first identification signals to perform a first subset of the data access operations, and wherein the memory controller circuit system selects the memory devices in the second virtual memory rank using the second identification signals to perform a second subset of the data access operations.

In Example 4, the memory system of any one of Examples 1-3 may further comprise: a third set of memory devices, wherein the memory controller circuit system groups a first one of the memory devices in the third set into the first virtual memory rank, and wherein the memory controller circuit system groups a second one of the memory devices in the third set into the second virtual memory rank.

In Example 5, the memory system of Example 1 may optionally include, wherein the memory controller circuit system generates first command signals that are provided to the first set of the memory devices and second command signals that are provided to the second set of the memory devices through the first set of the memory devices.

In Example 6, the memory system of Example 5 may optionally include, wherein the memory controller circuit system adjusts delays of first identification signals provided to the first set of the memory devices with respect to the first command signals to cause the first identification signals to fall within a first valid command eye, and wherein the memory controller circuit system adjusts delays of second identification signals provided to the second set of the memory devices with respect to the second command signals to cause the second identification signals to fall within a second valid command eye.

In Example 7, the memory system of any one of Examples 1-6 may optionally include, wherein the memory controller circuit system groups the first one of the memory devices in each of the first and the second sets into the first virtual memory rank based on the eye margins of the first data signals being more closely aligned in voltage and in time than the eye margins of the second data signals sampled by the memory devices in the second virtual memory rank.

In Example 8, the memory system of any one of Examples 1-7 may optionally include, wherein the memory devices in the first set are coupled together in a first vertical stack, and wherein the memory devices in the second set are coupled together in a second vertical stack that is physically separate from the first vertical stack.

Example 9 is a method for accessing memory devices in a memory system, the method comprising: grouping a first memory device in a first set of memory devices and a second memory device in a second set of memory devices into a first virtual memory rank using a memory controller circuit system based on eye margins of first data signals sampled by the first and the second memory devices; grouping a third memory device in the first set of memory devices and a fourth memory device in the second set of memory devices into a second virtual memory rank using the memory controller circuit system based on eye margins of second data signals sampled by the third and the fourth memory devices; accessing the first and the second memory devices in the first virtual memory rank during first memory access operations using the memory controller circuit system; and accessing the third and the fourth memory devices in the second virtual memory rank during second memory access operations using the memory controller circuit system.

In Example 10, the method of Example 9 may optionally include, wherein grouping the first memory device and the second memory device into the first virtual memory rank further comprises grouping the first memory device and the second memory device into the first virtual memory rank based on the eye margins of the first data signals being more closely aligned in voltage and in time than the eye margins of the second data signals sampled by the third and the fourth memory devices.

In Example 11, the method of any one of Examples 9-10 may optionally include, wherein the first and the third memory devices in the first set are coupled together, and wherein the second and the fourth memory devices in the second set are coupled together.

In Example 12, the method of any one of Examples 9-11 may further comprise: providing first identification signals to the first and the third memory devices in the first set; and providing second identification signals to the second and the fourth memory devices in the second set without routing the second identification signals through the first set of memory devices.

In Example 13, the method of Example 12 may further comprise: adjusting delays of the first identification signals with respect to first command signals using an adjustable delay circuit to cause the first identification signals to fall within a first valid command eye; and adjusting delays of the second identification signals with respect to second command signals using the adjustable delay circuit to cause the second identification signals to fall within a second valid command eye.

In Example 14, the method of any one of Examples 9-13 may optionally include, wherein grouping the first memory device and the second memory device into the first virtual memory rank further comprises grouping a fifth memory device in a third set of memory devices into the first virtual memory rank based on eye margins of third data signals sampled by the fifth memory device, and wherein grouping the third memory device and the fourth memory device into the second virtual memory rank further comprises grouping a sixth memory device in the third set of memory devices into the second virtual memory rank based on eye margins of fourth data signals sampled by the sixth memory device.

In Example 15, the method of any one of Examples 9-11 may further comprise: selecting the first and the second memory devices in the first virtual memory rank using first identification signals to enable the first memory access operations using the memory controller circuit system; and selecting the third and the fourth memory devices in the second virtual memory rank using second identification signals to enable the second memory access operations using the memory controller circuit system.

Example 16 is a memory system comprising: first and second memory devices in a first stack; third and fourth memory devices in a second stack; and a memory controller circuit system that provides first command signals to the first and the second memory devices and second command signals to the third and the fourth memory devices through the first stack, wherein the memory controller circuit system adjusts delays of first identification signals that identify the first and the second memory devices with respect to the first command signals to compensate for skew in the first command signals, and wherein the memory controller circuit system adjusts delays of second identification signals that identify the third and the fourth memory devices with respect to the second command signals to compensate for skew in the second command signals.

In Example 17, the memory system of Example 16 may optionally include, wherein the memory controller circuit system causes the first identification signals to fall within a first valid command eye and the second identification signals to fall within a second valid command eye.

In Example 18, the memory system of any one of Examples 16-17 may optionally include, wherein the memory controller circuit system groups a first one of the memory devices in each of the first and the second stacks into a first virtual memory rank based on eye margins of first data signals sampled by the first virtual memory rank, and wherein the memory controller circuit system groups a second one of the memory devices in each of the first and the second stacks into a second virtual memory rank based on eye margins of second data signals sampled by the second virtual memory rank.

In Example 19, the memory system of Example 18 may optionally include, wherein the memory controller circuit system selects the memory devices in the first virtual memory rank using a first subset of the first and the second identification signals to enable first memory access operations, and wherein the memory controller circuit system selects the memory devices in the second virtual memory rank using a second subset of the first and the second identification signals to enable second memory access operations.

In Example 20, the memory system of any one of Examples 16-19 may optionally include, wherein the second identification signals are routed to the third and the fourth memory devices without being routed through the first stack, and wherein the first identification signals are routed to the first and the second memory devices without being routed through the second stack.

It will be recognized by one skilled in the art, that the examples disclosed herein may be practiced without some or all of these specific details. In other instances, well-known operations have not been described in detail in order not to obscure the present examples. It should be appreciated that the examples disclosed herein can be implemented in numerous ways, such as a process, an apparatus, a system, a device, or a method on a computer readable medium.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. A memory system comprising:
   a first set of memory devices;
   a second set of memory devices; and
   a memory controller circuit system that groups a first one of the memory devices in each of the first and the second sets into a first virtual memory rank based on eye margins of first data signals sampled by the first one of the memory devices in each of the first and the second sets, wherein the memory controller circuit system groups a second one of the memory devices in each of the first and the second sets into a second virtual memory rank based on eye margins of second data signals sampled by the second one of the memory devices in each of the first and the second sets, and wherein the memory controller circuit system accesses the memory devices in the first virtual memory rank separately from the memory devices in the second virtual memory rank during data access operations.

2. The memory system of claim 1, wherein the memory controller circuit system provides first identification signals to the memory devices in the first set, wherein the memory controller circuit system provides second identification signals to the memory devices in the second set without routing the second identification signals through the first set of the memory devices, and wherein the memory controller circuit system comprises an adjustable delay circuit that adjusts delays of the first and the second identification signals to compensate for skew between command signals provided to the memory devices in the first and the second sets.

3. The memory system of claim 2, wherein the memory controller circuit system selects the memory devices in the first virtual memory rank using the first identification signals to perform a first subset of the data access operations, and wherein the memory controller circuit system selects the memory devices in the second virtual memory rank using the second identification signals to perform a second subset of the data access operations.

4. The memory system of claim 1 further comprising:
   a third set of memory devices, wherein the memory controller circuit system groups a first one of the memory devices in the third set into the first virtual memory rank, and wherein the memory controller circuit system groups a second one of the memory devices in the third set into the second virtual memory rank.

5. The memory system of claim 1, wherein the memory controller circuit system generates first command signals that are provided to the first set of the memory devices and second command signals that are provided to the second set of the memory devices through the first set of the memory devices.

6. The memory system of claim 5, wherein the memory controller circuit system adjusts delays of first identification signals provided to the first set of the memory devices with respect to the first command signals to cause the first identification signals to fall within a first valid command eye, and wherein the memory controller circuit system adjusts delays of second identification signals provided to the second set of the memory devices with respect to the second command signals to cause the second identification signals to fall within a second valid command eye.

7. The memory system of claim 1, wherein the memory controller circuit system groups the first one of the memory devices in each of the first and the second sets into the first virtual memory rank based on the eye margins of the first data signals being more closely aligned in voltage and in time than the eye margins of the second data signals sampled by the second one of the memory devices in each of the first and the second sets.

8. The memory system of claim 1, wherein the memory devices in the first set are coupled together in a first vertical stack, and wherein the memory devices in the second set are coupled together in a second vertical stack that is physically separate from the first vertical stack.

9. A method for accessing memory devices in a memory system, the method comprising:
   grouping a first memory device in a first set of the memory devices and a second memory device in a second set of the memory devices into a first virtual memory rank using a memory controller circuit system based on eye margins of first data signals sampled by the first and the second memory devices;
   grouping a third memory device in the first set of the memory devices and a fourth memory device in the second set of the memory devices into a second virtual memory rank using the memory controller circuit system based on eye margins of second data signals sampled by the third and the fourth memory devices;

accessing the first and the second memory devices in the first virtual memory rank during first memory access operations using the memory controller circuit system; and accessing the third and the fourth memory devices in the second virtual memory rank during second memory access operations using the memory controller circuit system.

10. The method of claim 9, wherein grouping the first memory device and the second memory device into the first virtual memory rank further comprises grouping the first memory device and the second memory device into the first virtual memory rank based on the eye margins of the first data signals being more closely aligned in voltage and in time than the eye margins of the second data signals sampled by the third and the fourth memory devices.

11. The method of claim 9, wherein the first and the third memory devices in the first set are coupled together, and wherein the second and the fourth memory devices in the second set are coupled together.

12. The method of claim 9 further comprising:
providing first identification signals to the first and the third memory devices in the first set; and
providing second identification signals to the second and the fourth memory devices in the second set without routing the second identification signals through the first set of the memory devices.

13. The method of claim 12 further comprising:
adjusting delays of the first identification signals with respect to first command signals using an adjustable delay circuit to cause the first identification signals to fall within a first valid command eye; and
adjusting delays of the second identification signals with respect to second command signals using the adjustable delay circuit to cause the second identification signals to fall within a second valid command eye.

14. The method of claim 9, wherein grouping the first memory device and the second memory device into the first virtual memory rank further comprises grouping a fifth memory device in a third set of the memory devices into the first virtual memory rank based on eye margins of third data signals sampled by the fifth memory device, and wherein grouping the third memory device and the fourth memory device into the second virtual memory rank further comprises grouping a sixth memory device in the third set of the memory devices into the second virtual memory rank based on eye margins of fourth data signals sampled by the sixth memory device.

15. The method of claim 9 further comprising:
selecting the first and the second memory devices in the first virtual memory rank using first identification signals to enable the first memory access operations using the memory controller circuit system; and selecting the third and the fourth memory devices in the second virtual memory rank using second identification signals to enable the second memory access operations using the memory controller circuit system.

16. A memory system comprising:
first and second memory devices in a first stack;
third and fourth memory devices in a second stack; and
a memory controller circuit system that provides first command signals to the first and the second memory devices and second command signals to the third and the fourth memory devices through the first stack,
wherein the memory controller circuit system adjusts delays of first identification signals that identify the first and the second memory devices with respect to the first command signals to compensate for skew in the first command signals, and wherein the memory controller circuit system adjusts delays of second identification signals that identify the third and the fourth memory devices with respect to the second command signals to compensate for skew in the second command signals.

17. The memory system of claim 16, wherein the memory controller circuit system causes the first identification signals to fall within a first valid command eye and the second identification signals to fall within a second valid command eye.

18. The memory system of claim 16, wherein the memory controller circuit system groups a first one of the memory devices in each of the first and the second stacks into a first virtual memory rank based on eye margins of first data signals sampled by the first one of the memory devices in each of the first and the second stacks, and wherein the memory controller circuit system groups a second one of the memory devices in each of the first and the second stacks into a second virtual memory rank based on eye margins of second data signals sampled by the second one of the memory devices in each of the first and the second stacks.

19. The memory system of claim 18, wherein the memory controller circuit system selects the memory devices in the first virtual memory rank using a first subset of the first and the second identification signals to enable first memory access operations, and wherein the memory controller circuit system selects the memory devices in the second virtual memory rank using a second subset of the first and the second identification signals to enable second memory access operations.

20. The memory system of claim 16, wherein the second identification signals are routed to the third and the fourth memory devices without being routed through the first stack, and wherein the first identification signals are routed to the first and the second memory devices without being routed through the second stack.

* * * * *